Patented Nov. 7, 1950

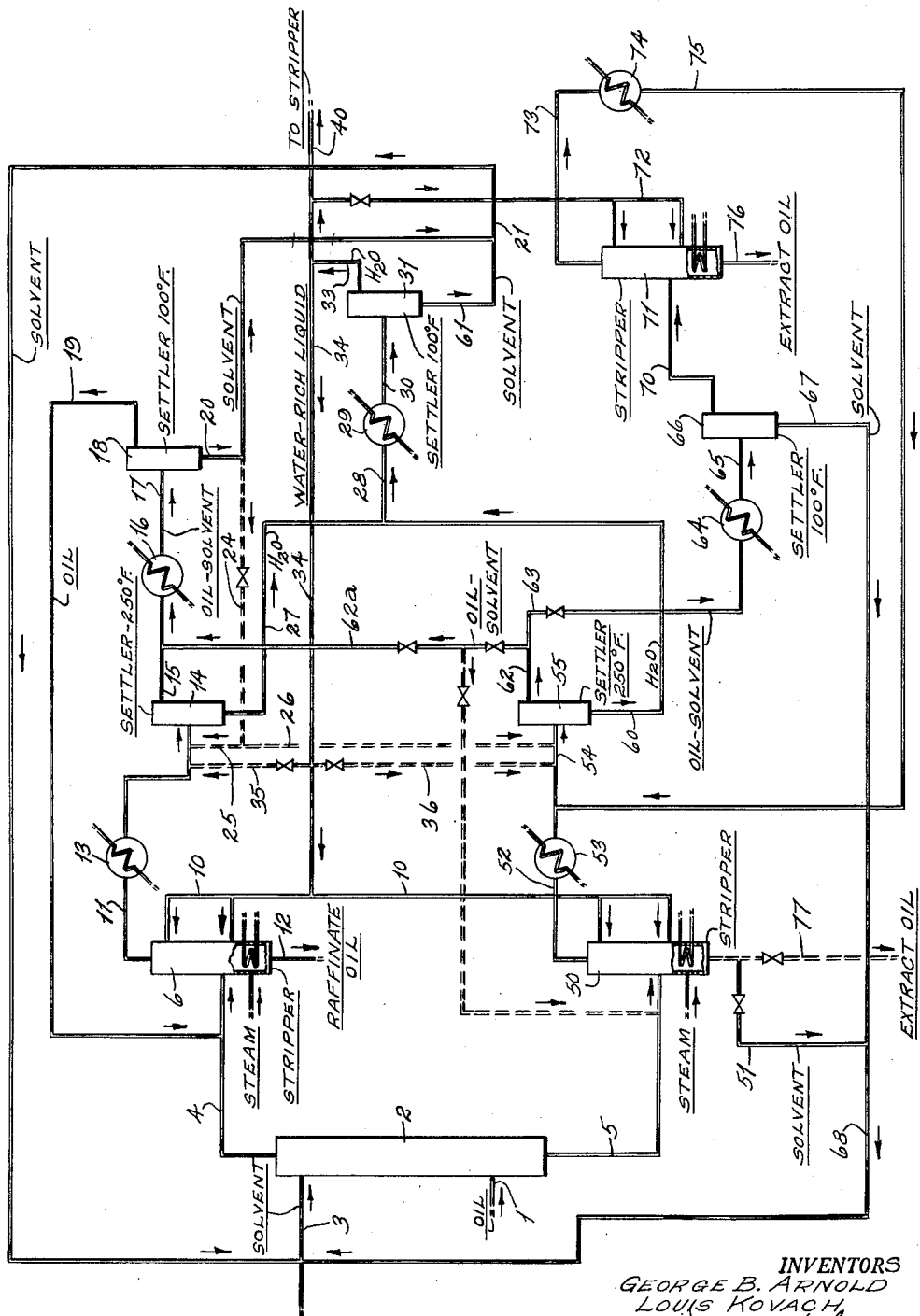

2,529,274

UNITED STATES PATENT OFFICE 2,529,274

SOLVENT REFINING OF LIGHT OILS

George B. Arnold and Louis Kovach, Beacon, N. Y., assignors to The Texas Company, New York, N. Y., a corporation of Delaware Application September 1, 1948, Serial No. 47,204

5 Claims. (Cl. 196—14.26)

This invention relates to the solvent refining of light oils by liquid-liquid extraction with a solvent liquid which is at least partially miscible with water at ordinary temperatures and particularly relates to the treatment of oil containing at least a small proportion of constituents having true boiling points in the range of the solvent boiling temperature and below.

The invention has particular application to the refining of kerosene and gas oils with a solvent such as furfural wherein the resulting extract and raffinate phases are subjected to azeotropic distillation in the presence of water to effect separation of solvent from extract and raffinate oils, respectively. Distillate obtained by such distillation comprises ternary azeotropes of oil, solvent and water.

In accordance with the present invention the distillates obtained from the extract and raffinate phase mixtures are subjected to settling at a relatively high temperature above 200–250° F. so as to separate them into primary phases, respectively rich in oil and water. The primary oil-rich liquid is withdrawn and subjected to settling at a relatively lower temperature, for example, in the range of about 70–150° F. When a gas oil of relatively high aromatic hydrocarbon content is being charged to the extraction system the primary oil-rich liquids segregated from both the extract and raffinate phases may be subjected to such low temperature settling in the presence of each other. On the other hand, when kerosene of a relatively low aromatic hydrocarbon content is being charged, it is advantageous to dispose of the primary oil-rich liquid segregated from the extract phase in a somewhat different procedure as will be described later on in connection with the description of the drawing.

The low temperature settling results in the formation of secondary phases respectively comprising mainly oil and mainly solvent. The secondary oil phase is recycled to the azeotropic distillation of the raffinate phase while the secondary solvent-rich liquid is recycled to the extraction zone and may be recycled in part to the high temperature settling zones as will be described.

The primary water-rich liquid is separately subjected to settling at a relatively low temperature in the range about 70–150° F. Advantageously, the primary water-rich liquid obtained from both the raffinate and extract phases is commingled prior to such low temperature settling.

This latter settling results in the formation of tertiary phases respectively comprising mainly water and mainly solvent. The tertiary solvent phase liquid is recycled to the extraction zone while the tertiary water-rich liquid containing a small amount of furfural can be recycled in part to the aforesaid azeotropic distillations and also in part to the aforesaid high temperature settling zones. The non-recycled tertiary water-rich liquid is subjected to a final stripping or fractionating operation to recover the residual solvent, the water so removed being discharged from the system.

The process of this invention distinguishes from that disclosed in our pending application Serial No. 26,688 filed May 12, 1948, for Improvements in Refining Kerosenes and Gas Oils by Ternary Azeotropic Distillation with Furfural and Water in a number of respects and mainly in that the present invention involves liquid-liquid extraction of the feed oil.

The present invention also distinguishes from pending application Serial No. 777,071 filed September 30, 1947, and relating to a Method of Refining Oil with a Solvent. This latter application was filed by William E. Skelton and George B. Arnold, the latter being one of the present joint applicants. In contrast with the method disclosed in this last mentioned pending application the present invention involves employing staged settling of the azeotropic mixtures obtained from the distillation of the resulting raffinate and extract phase mixtures, this staged settling being carried out at different temperature levels as previously indicated.

Settling of the distillate mixtures from the solvent recovery step at two temperatures as contemplated in the present application makes possible the recovery of the solvent with a very low oil content and satisfactory for the recycling to the extraction zone without the necessity of subjecting the main body of solvent to a final fractionating or stripping operation.

In order to illustrate the invention in more detail reference will now be made to the accompanying drawing.

As indicated in the drawing, feed oil is obtained from a source not shown and conducted through a pipe 1 for introduction to a conventional counterflow extraction tower 2. The oil in question may be a raw kerosene distillate of relatively low aromatic content having the following physical characteristics:

| | |
|---|---:|
| Gravity, A. P. I. | 40.4 |
| Aniline point °F | 130.5 |
| Sulphur weight per cent | 0.19 |
| Refractive index | 1.4551 |
| Distillation, A. S. T. M.: | |
|   I. B. P. °F | 360 |
|   10% °F | 384 |
|   50% °F | 401 |
|   90% °F | 440 |
|   End point °F | 494 |

The solvent comprising furfural is also admitted through a pipe 3 to the upper portion of the tower 2. This solvent will comprise mainly recycled solvent containing a small amount of water and also a small amount of oil.

The resulting raffinate phase mixture is removed from the top of the tower through pipe 4 while the resulting extract solution is removed from the bottom of the tower through a pipe 5.

The raffinate mixture flows from pipe 4 into a ternary azeotropic distillation tower 6, water returned from a subsequent point in the system is introduced to the tower 6 from a pipe 10 to provide water for stripping and for reflux and thus aid in azeotrope formation. The amount of water so injected is adjusted so that the ternary oil-water-furfural azeotrope obtained as distillate contains all of the solvent in the raffinate phase mixture. The top of the tower is maintained at a temperature of about 275–310° F. The hot condensate is passed to a settler 14 maintained at substantially 250° F. and under substantially the same pressure prevailing within the tower 6.

Under these conditions, separation into primary phases occurs. An oil-rich phase containing approximately equal parts by volume of furfural and oil plus a fraction of a per cent of water is obtained while a water-rich phase containing approximately 85% water and 15% furfural with a fraction of a per cent of oil is obtained. The oil in the oil-rich phase tends to be of relatively paraffinic character, and has the following characteristics:

| | |
|---|---:|
| Gravity, °A. P. I. | 44.0 |
| Aniline point °F | 143.6 |
| Sulfur wt. per cent | 0.077 |
| Refractive index | 1.4445 |

These phases are separately withdrawn. The oil-rich phase is passed through pipe 15, cooler 16 and pipe 17 to a settler 18 maintained at a temperature of about 100° F.

In the settler 18 an oil-rich phase is obtained containing about 94% oil and 6% furfural with a trace of water while a furfural-rich phase is obtained containing about 85% furfural and 15% oil with a trace of water. This secondary oil phase is recycled through pipe 19 to the azeotropic distillation column 6.

The secondary solvent-rich phase is drawn off through pipe 20 to a pipe 21 by which it is recycled to the extraction column 2. If desired a portion thereof may be recycled through pipe 24 and branch pipe 25 to the settler 14 or through branch pipe 26 to the settling zone wherein the azeotropic distillate from the extract phase mixture is settled.

The primary water-rich liquid is drawn off from the settler 14 through a pipe 27 to a pipe 28 from which it flows through a cooler 29 and pipe 30 to a settler 31 wherein it is subjected to settling at about 100° F. to form two liquid phases. A tertiary water-rich liquid containing about 93% water and 7% furfural is drawn off through pipe 33 and conducted into pipe 34 linking with the previously mentioned pipe 10. As indicated, a portion of this water-rich phase liquid may be diverted through pipe 35 to the settler 14. Another portion thereof may be diverted through another branch pipe 36 to the zone in which the azeotropic distillate recovered from the extract phase mixture is settled.

Recycling of this water to the high temperature settling zones effects removal of more furfural from these zones dissolved in water. The solvent furfural which is recycled to the extraction tower from the low temperature settling zones is characterized by a low oil content.

That portion of the tertiary water-rich phase not recycled is drawn off through pipe 40 to a final stripper not shown wherein the residual solvent may be recovered and the water discharged.

The extract phase mixture drawn off from the extraction tower 2 through pipe 5 is conducted to a distillation tower 50 similar to the tower 6. When kerosene or an oil of relatively low aromatic hydrocarbon content is being charged to the system sufficient water is injected into tower 50 so as to remove as a distillate a ternary water-furfural-oil azeotrope containing substantially all of the hydrocarbon present in the extract phase mixture. The top of the tower is maintained at a temperature of about 275–310° F.

Substantially oil-free solvent is discharged from the bottom of the tower 50 through pipe 51 for recycling to the extraction tower 2.

The distillate is removed from the top of the tower thru pipe 52 and condenser 53 wherein it is condensed at a temperature of about 250° F. The hot condensate is conducted through pipe 54 to a settler 55 maintained at about 250° F. under a pressure substantially that prevailing in the tower 50.

Two phases are formed in the settler 55, an oil-rich phase containing about equal parts by volume of furfural and oil with a trace of water and a water-rich phase containing approximately 85% water and 15% furfural with a trace of oil. The oil in the oil-rich phase when charging a kerosene or an oil of relatively low aromatic hydrocarbon content is the extract oil and has the following properties.

| | |
|---|---:|
| Gravity, °A. P. I. | 40.2 |
| Aniline point °F | 74.8 |
| Sulfur | 0.37 |
| Refractive index | 1.4665 |

In event a gas oil or an oil of relatively high aromatic hydrocarbon content is being charged the oil in the oil-rich phase of settler 55 consists of the paraffinic portion of the extract oil and is similar in properties to the oil in the oil-rich phase of settler 14, thus being of raffinate oil character.

The aromatic constituents of the extract do not azeotrope with water and furfural and are found in the bottoms of tower 50. When operating on a kerosine (an oil of low aromatic hydrocarbon content) the extract is more hydroaromatic, azeotropes with water and furfural, is removed as distillate in tower 50 and forms the oil components of settler 55.

The furfural in the raffinate solution stream, when charging a kerosine (an oil of low aromatic hydrocarbon content), is removed as distillate and the furfural in the extract solution stream is removed in part as residue for the following reasons. In the case of the raffinate solution the furfural is removed as a ternary oil-water-furfural azeotrope. Since the raffinate oil is the excess component, the part of the oil which is in excess of that required to form the oil-water-furfural azeotrope is recovered as residue from the raffinate azeotrope tower. In the case of the extract solution, the furfural is the excess component and the same reasoning applies. The furfural which is in excess of that required to form the oil-water-furfural azeotrope is recovered as residue from the extract azeotrope tower. The component of a feed to an azeotrope tower which is recovered as residue is that component which is present in the feed in excess of the amount required to form the azeotrope which distills overhead.

The water-rich phase is drawn off through pipe 60 which connects with pipe 28 and by which means this liquid is cooled and passed to the settler 31 to which reference has previously been made.

The solvent-rich liquid accumulating in the bottom of the settler 31 is drawn off through pipe 61 which connects with pipe 21 previously mentioned.

The oil-rich liquid is drawn from the top of the settler 55 through pipes 62 and 63 and then through a cooler 64 wherein the liquid is cooled to about 100° F. From the cooler 64 it flows through a pipe 65 to a settler 66 wherein separation into two phases, a quaternary oil-rich and a quaternary solvent-rich phase, occurs. The oil-rich phase of this settler contains about 94% oil and 6% furfural with a trace of water while the furfural phase contains about 85% furfural and 15% oil with a trace of water. This furfural-rich phase is discharged through pipe 67 into pipe 68 through which it is recycled to the extraction column 2.

The oil-rich phase is removed through pipe 70 to a distillation column 71 similar to columns 6 and 50 and operated under sufficient pressure for condensation of distillate at 250° F. Sufficient water is added as reflux and as stripping medium through pipe 72 to take overhead a ternary oil-water-furfural azeotrope containing all the furfural present in the column. This distillate is removed through pipe 73 and condenser 74 wherein it is condensed at about 250° F. From the condenser it is passed through pipe 75 into pipe 54 for introduction to the previously mentioned settler 55.

Substantially solvent-free extract oil is discharged from the bottom of the tower 71 through pipe 76.

In the event that gas oil or an oil of relatively high aromatic hydrocarbon content is being charged to the extraction tower 2, the settler 66 and the distillation column 71 are by-passed. In this case sufficient water is injected into tower 50 to remove as a distillate a ternary water-furfural-hydrocarbon azeotrope containing all of the furfural in the extract phase mixture, so that solvent-free extract oil is discharged from the bottom of the tower 50 by means of pipe 77. The primary oil-rich liquid drawn off from the settler 55 through pipe 62 is diverted through pipe 62a into pipe 15 wherein it is commingled with the primary oil-rich liquid drawn off from the settler 14.

The process has application to the treatment of fresh virgin or cracked gas oils. In general it is particularly adapted to the treatment of hydrocarbon mixtures having an ASTM boiling range of about 275 to 600° F. and may have application to the treatment of oils derived from animal and vegetable sources. Specific conditions of temperature and solvent dosage may vary from those mentioned above depending upon the character of the feed oil undergoing treatment and the degree of fractionation desired.

Other solvents may be used which are relatively high boiling organic liquids miscible at least to some extent with water at a temperature of about 100° F. and with which the refined oil constituents of the oil feed in the presence of water form azeotropes. Other members of the furan group may be used as well as other aldehydes such as benzaldehyde. Other solvent compounds are nitrobenzene, ketones, phenols and amines.

Obviously many modifications and variations of the invention as above set forth may be made without departing from the spirit and scope thereof, and, therefore, only such limitations should be imposed as are indicated in the appended claims.

We claim:

1. A method of solvent refining of hydrocarbon oil boiling in the range of about 275 to 600° F., relatively low in aromatic constituents and containing at least a small proportion of constituents having true boiling points in the range of the solvent boiling temperature and below with an organic solvent liquid at least partially miscible with water at 100° F. and with which, in the presence of water, refined oil constituents of the feed form azeotropes which comprises subjecting said oil to liquid-liquid extraction with said solvent thereby forming extract and raffinate phases respectively, each of said phases comprising oil and solvent liquid, separately subjecting each of said phases to azeotropic distillation in the presence of water added in substantial amount to the zone of distillation thereby forming distillates each comprising a ternary azeotrope of oil, solvent and water, the distillate from the raffinate phase containing substantially all of the solvent present therein and the distillate from the extract phase containing substantially all of the hydrocarbon present therein, separately condensing said distillates, separately subjecting each condensate in the presence of water to settling at a relatively high temperature in the range about 200° F. and higher thereby forming primary phases respectively rich in oil and water, each primary phase containing some solvent liquid, separately withdrawing said primary phases, subjecting primary oil-rich liquid to settling at relatively low temperature of about 70-150° F. thereby forming secondary phases respectively comprising mainly oil and mainly solvent, separately withdrawing said secondary phases, recycling secondary oil-rich phase to the raffinate phase azeotropic distillation, subjecting primary water-rich liquid to settling at a relatively low temperature of about 70-150° F. thereby forming tertiary phases comprising respectively mainly water and mainly solvent, separately withdrawing said tertiary phases, recycling tertiary water phase at least in part to said azeotropic distillations and recycling tertiary solvent phase to said liquid-liquid extraction.

2. The method according to claim 1 in which a portion of tertiary water phase is commingled with condensate prior to said high temperature settling.

3. The method according to claim 1 in which primary oil-rich liquids segregated from the distillates produced in the azeotropic distillation of both extract and raffinate phases are commingled prior to said low temperature settling.

4. The method according to claim 1 in which the azeotropic distillation of the extract phase is effected so as to produce a distillation residue of substantially oil-free solvent and a distillate ternary azeotrope containing substantially all the extract oil, segregating a primary oil-rich phase from said ternary azeotrope by high temperature settling in the presence of water, separately subjecting said segregated phase to low temperature settling to form quaternary phases comprising respectively mainly oil and mainly solvent, separately withdrawing said quaternary phases, recycling quaternary solvent-rich phase to said liquid-liquid extraction, and stripping residual solvent from said quaternary oil phase.

5. The method according to claim 1 in which the organic solvent liquid is a furan compound.

GEORGE B. ARNOLD.
LOUIS KOVACH.

REFERENCES CITED

The following references are of record in the file of this patent:

UNITED STATES PATENTS

| Number | Name | Date |
|---|---|---|
| 2,081,884 | Roberts | May 25, 1937 |
| 2,167,730 | Smoley | Aug. 1, 1939 |
| 2,168,570 | Kraft | Aug. 8, 1939 |
| 2,177,183 | Kraft | Oct. 24, 1939 |
| 2,186,298 | Kiersted et al. | Jan. 9, 1940 |
| 2,307,242 | Savelli | Jan. 5, 1943 |
| 2,381,996 | Bloomer | Aug. 14, 1945 |